(12) United States Patent
Krysiak et al.

(10) Patent No.: US 8,474,183 B2
(45) Date of Patent: Jul. 2, 2013

(54) COLORED OR FRAGRANCED HORTICULTURAL/AGRICULTURAL PRODUCTS

(75) Inventors: Michael D. Krysiak, Green Bay, WI (US); Bryan A. Fish, Green Bay, WI (US); Daniel P. Madigen, Green Bay, WI (US)

(73) Assignee: ENCAP, LLC., Green Bay, WI (US)

( * ) Notice: Subject to any disclaimer, the term of this patent is extended or adjusted under 35 U.S.C. 154(b) by 0 days.

(21) Appl. No.: 09/769,076

(22) Filed: Jan. 25, 2001

(65) Prior Publication Data

US 2001/0022047 A1    Sep. 20, 2001

Related U.S. Application Data

(63) Continuation-in-part of application No. 09/544,878, filed on Apr. 7, 2000, which is a continuation-in-part of application No. 09/113,254, filed on Jul. 10, 1998, now Pat. No. 6,209,259, and a continuation-in-part of application No. 09/510,782, filed on Feb. 23, 2000.

(51) Int. Cl.
*A01G 7/00* (2006.01)

(52) U.S. Cl.
USPC ............................ 49/9; 47/58.1 R; 47/DIG. 10

(58) Field of Classification Search
USPC .................... 47/9, 48.5; 111/144, 102; 71/23, 71/11
See application file for complete search history.

(56) References Cited

U.S. PATENT DOCUMENTS

| | | | | |
|---|---|---|---|---|
| 2,526,938 A | * | 10/1950 | Davis et. al. | 436/41 |
| 3,216,802 A | * | 11/1965 | Smith, Jr. | 436/41 |
| 3,252,785 A | * | 5/1966 | Hoblit | |
| 3,645,714 A | * | 2/1972 | Heming et al. | 71/23 |
| 3,702,755 A | * | 11/1972 | Palmer | 422/412 |
| 3,876,411 A | * | 4/1975 | Fowler | 71/11 |
| 4,067,140 A | * | 1/1978 | Thomas | 47/9 |
| 4,126,417 A | * | 11/1978 | Edwards | 422/56 |
| 4,232,480 A | | 11/1980 | Videen | |
| 4,297,810 A | * | 11/1981 | Hansford | 47/9 |
| 4,327,731 A | * | 5/1982 | Powell | 604/361 |
| 4,339,890 A | | 7/1982 | Koenig et al. | |
| 4,368,591 A | | 1/1983 | Barke et al. | |
| 4,761,423 A | | 8/1988 | Szegö et al. | |
| 4,853,429 A | | 8/1989 | Sannan et al. | |
| 4,881,343 A | | 11/1989 | Sannan et al. | |
| 4,932,156 A | * | 6/1990 | Underwood | 47/9 |
| 5,087,475 A | | 2/1992 | Bazin et al. | |
| 5,105,577 A | * | 4/1992 | Hedges | 47/9 |

(Continued)

FOREIGN PATENT DOCUMENTS

| | | | |
|---|---|---|---|
| DE | 4017334 A1 | * | 12/1990 |
| GB | 2170795 A | * | 8/1986 |
| JP | 01262735 A | * | 10/1989 |
| JP | 06-245654 | * | 9/1994 |

OTHER PUBLICATIONS

English Translation, JP01262735A, Hisaya Yamada, Method for Adjusting the Concentration of a Hydroponic Solution, Oct. 1989, 10 pages + title page.*

*Primary Examiner* — Andrea Valenti
(74) *Attorney, Agent, or Firm* — Philip M. Weiss; Weiss & Weiss

(57) ABSTRACT

The present invention relates to horticultural products and a method for making gardening products which have a dye or fragrance added to the products.

15 Claims, 7 Drawing Sheets

U.S. PATENT DOCUMENTS

| | | | |
|---|---|---|---|
| 5,143,023 A * | 9/1992 | Kuhns | 119/173 |
| 5,192,587 A | 3/1993 | Rondy | |
| 5,235,781 A * | 8/1993 | Holley | 47/56 |
| 5,308,653 A | 5/1994 | Rondy | |
| 5,387,745 A * | 2/1995 | Brendle | 504/358 |
| 5,543,321 A | 8/1996 | Guri | |
| 5,585,150 A | 12/1996 | Sheehan | |
| 5,697,984 A * | 12/1997 | Swatzina et al. | 8/527 |
| 5,734,167 A * | 3/1998 | Skelly | 250/458.1 |
| 5,766,312 A * | 6/1998 | Furhmann et al. | 95/117 |
| 5,853,541 A | 12/1998 | Monroe et al. | |
| 6,019,062 A * | 2/2000 | Lombard et al. | 119/172 |
| 6,021,598 A * | 2/2000 | Holton | 47/9 |
| 6,029,394 A * | 2/2000 | Kananen et al. | 47/1.1 |
| 6,058,647 A * | 5/2000 | Emalfarb | 47/1.01 R |
| 6,076,299 A * | 6/2000 | Spittle et al. | 47/9 |
| 6,202,344 B1 * | 3/2001 | Clarke et al. | 47/9 |
| 6,324,781 B1 * | 12/2001 | Stevens | 47/9 |
| 2003/0056710 A1 * | 3/2003 | Radmacher et al. | 116/206 |

* cited by examiner

COLORED OR FRAGRANCED HORTICULTURAL/AGRICULTURAL PRODUCTS

RELATED PATENT APPLICATIONS

The application is a continuation-in-part of Ser. No. 09/544,878 filed Apr. 17, 2000, which is a continuation-in-part of U.S. patent application Ser. No. 09/113,254 filed Jul. 10, 1998. The application is also a continuation-in-part of Ser. No. 09/510,782 filed Feb. 23, 2000.

FIELD OF THE INVENTION

The present invention relates to horticultural products and a method for making gardening products which have a dye or fragrance added to the products.

BACKGROUND OF THE INVENTION

Mulches are commonly applied over grass seed beds. Mulches help to increase seed germination and decrease soil erosion allowing seeds to become firmly established in the seeded area. Mulches typically consist of straw, wood shavings, or paper. In the prior art, mulches are mixed with water and agitated in a holding tank, and then sprayed onto a seed bed. Some mulches are woven into blankets that are designed to be laid down over seed beds. Some mulches are chemically bonded natural fiber spray-applied mulches. These mulches use a vegetable gum binder such as guar gum to bind together natural fibers.

Most mulches are loose configurations of unbonded fibers that easily wash away. Paper-based mulches tend to bond into a paper mache-like mat that inhibits oxygen and sunlight transfer, and the ability of seedlings to emerge through the mulch, affecting vegetation establishment. Chemically-bonded mulch forms an almost impenetrable layer over the seed bed that is poor at passing oxygen and water through to the seed bed.

Horticultural/Agricultural growers, gardeners, landscape operators, flower growers, and the like produce a wide variety of cultivated plants. Many such crops are grown from seed. The sizes, shapes, and physical characteristics of the various kinds of seeds are as varied as the number of crops produced therefrom.

Producers of such cultivated crops encounter a variety of challenges in handling and distributing such seed, as well as with sowing of such seed in suitable growing media. Certain seed may desirably be sowed by a broadcast method if the seed were compatible with broadcast application. For example, grass seed for lawns is desirably broadcast, but the low density and generally non-aerodynamic shape of some grass seed can limit the range of such broadcast, and make such seed susceptible to being blown about by wind, or washed away by surface water, even if initially well placed in a good seeding application.

Another difficulty encountered in sowing seed is that the seed may be so small as to be difficult to handle, thereby to place properly-spaced seeds at a desired spacing as to make cost-effective use of the seed, thereby to produce a crop of the related plants without using any more seed than necessary, thus to gain maximum benefit from the amount of seed used.

While small seed may be efficiently handled by industrial equipment especially designed for handling such seed, typically the user of such seed also handles various other types of seed; and may be unable to justify the cost of such specialty seed-handling equipment. Rather, the seed user typically has a limited range of seed handling equipment which must be capable of being used and/or adapted to handle and apply all the types of seeds being used by that user. Where the seed itself can be adapted to the equipment, specialty seed can be handled without need for any specialized equipment.

Even where the seed may be sown by hand, such as seedling or bedding trays or pots, some seeds are so small as to be difficult for the sower/user to effectively manipulate and control by hand. Typical of such difficult to handle seeds are seeds of lettuce, carrots, the cabbage family, ground cherries, and alfalfa. Many flower seeds are equally small and/or difficult to handle and/or manipulate, for example poppy seed.

A properly conditioned soil has advantageous soil chemistry in combination with advantageous soil texture. Thus, in addition to providing specific plant nutrients, soil users also use products that modify basic soil chemistry, and soil texture.

Basic soil chemistry is modified by adding to the soil, for example, calcium products to provide pH control, and flyash or like products to provide pH control as well as micronutrients.

U.S. Pat. No. 4,761,423 relates to a seed dressing applied to winter wheat, bean, pea or sorghum seed to protect the seed from insect or fungal damage. The seed dressing comprises animal, vegetable or mineral oil, an emulsifier, dyestuff and water.

U.S. Pat. No. 4,368,591 relates to seeds with an active ingredient and between 0.035 and 1.80 g of titanium dioxide per kg of seed in either the rutile or anatase form. The titanium dioxide serves, in conjunction with a coloring agent, to provide a bright, opaque coating to the seed.

U.S. Pat. Nos. 4,881,343 and 4,853,429 relate to a seed colorant useful especially in coloring seeds to distinguish same from the seeds to be used for foods is formed of an aqueous medium such as water, a dye and/or pigment of a desired hue, and a binder resin composed of the salt of chitosan and an organic acid. The seed colorant may additionally contain spherical resin particles.

U.S. Pat. No. 5,087,475 relates to a process for the film-coating of seed materials. A batch of seed materials is film coated with a gas and water permeable, thin, adherent, uniform non-phytotoxic continuous liquid surface film of a polymeric film former.

U.S. Pat. No. 5,543,321 relates to a sterilized plant culture medium comprising a dye in an amount which imparts a visible color to the culture medium and which permits seed germination is provided which is useful for attracting children, for observing and studying seed germination, root and shoot formation and whole plant development, and for color-coding plant cultures.

U.S. Pat. Nos. 5,308,653 and 5,192,587 relate to a comminuted wood that is converted to a colored wood product useful as a mulch. The product is produced by feeding a comminuted wood into a screw conveyer. The comminuted wood is contacted in the lower end of the conveyor by a liquid color-imparting agent, preferably an aqueous solution containing iron oxide pigment, carbon black pigment or a mixture of both pigments. After contacting, rotation of the auger draws the moist colored wood product towards the upper end, permitting runoff of excess liquid agent, which returns by gravity to the basin for further contacting with newly-fed comminuted wood. Colored wood product discharges through a chute at the upper end of the conveyor for further drying, if necessary.

U.S. Pat. No. 5,235,781 relates to a compacted agglomerate in the form of a pillow-shaped briquette. It contains finely pulverized paper and a fertilizer in the form of a granular powder or liquid. The pulverized paper may be paper dust. A dye may also be added to provide a more colorful product.

U.S. Pat. No. 6,076,299 relates to mulching pellets made from finely divided paper and wood, a clay binder, a highly water absorbent natural polymer, and a surfactant. The pellets absorb at least four times their weight in water. The pellets substantially reduce water run-off and soil erosion as compared to other mulch pellets.

U.S. Pat. No. 6,021,598 relates to a pourable, granular paper mulch product. A dye or a combination of dyes are used which will impart to the mulch product a color which resembles that of actual grass, a green color.

U.S. Pat. No. 5,853,541 relates to a degradable agricultural mulch, mat or ground cover including cotton linters fibers, hardwood kraft pulp fibers, softwood kraft pulp fibers, and a water holdout material which is strong enough to be laid mechanically and is 100% photo- or biodegradable.

U.S. Pat. No. 5,585,150 relates to a biodegradable mulch product comprising sheets or finely divided particles of cellulosic fibrous material bonded together with a bonding agent comprising a water-based bonding adhesive and compressed to form a laminar layer, said compressed laminar layer being cut into mulch-size pieces that simulate natural tree mulches in appearance, density and rate biodegradation.

U.S. Pat. No. 4,932,156 relates to a method for controlling the color of mulch for retarding the fading of the color of the mulch and/or restoring the color of mulch that has faded due to prolonged exposure to actinic light and ambient weather conditions be applying a brown color-control solution to the surface of the mulch.

U.S. Pat. No. 4,232,480 relates to a viscous liquid containing dye and possibly further additives is added to a package of hydraulic mulch material for hydraulic mulching. The viscous liquid and its additive are suitable to be later uniformly mixed through the hydraulic mulch during subsequent mixing and agitation with water prior to application, thereby eliminating the need for precoloring of the mulch material.

U.S. Pat. No. 4,067,140 relates to a mulch having finely divided fibers of paper coated with a wetting agent and preferably dyed a pleasing color such as green. To produce the mulch, finely divided fibers of paper are coated with a mixture of a solvent or carrier such as water, wetting agent and a dye. The finely divided fibers of paper are contacted with the mixture such as by tumbling the fibers of paper while spraying the mixture into the drum.

U.S. Pat. No. 6,021,598 relates to a pourable, granular paper mulch product including a granular solid comprising at least about 85% paper by weight and at least 6% water by weight, and having a settled density of at least about 15 pounds per cubic foot is prepared by comminuting paper, mixing the comminuting paper with water to form a pulp, extruding the pulp through a die orifice, chopping the extrudate to a length of less than about ⅛ inch to form granules, and drying the granules to achieve a final moisture content of from about 6% to about 13% by weight.

U.S. Pat. No. 4,339,890 relates to a dry seeding mulch having finely shredded or ground particles of waste paper mixed with a dry powdered chemical wetting agent and injected, after bagging, with a concentrated dye mixture which imparts color to the entire bag of mulch when mixed with water by the ultimate user. The dye is added to the finely shredded paper and the dye crystallizes and changes color.

The prior art does not teach a horticultural product, such as a seed or mulch that has a fragrance added to it. The prior art does not teach adding a dye to a coating of a seed.

SUMMARY OF THE INVENTION

The present invention relates to a product and method for colored and fragranced horticultural/agricultural products. The present invention relates to a colored seed comprising a seed, a binder, a coating surrounding the seed, and a dye and/or pigment within and/or on said coating. It is an object of the present invention for the dye to be capable of changing colors based on the acidity of soil. It is a further object of the present invention to provide a dye being capable of changing colors in response to the moisture content added to the soil. It is a further object of the invention to provide a dye being capable of changing colors depending on the chemical content of the soil. It is a further object of the invention to provide a dye being capable of deterring animals from eating the seed.

It is an object of the present invention for the dye to be selected from a group consisting of acid, basic and/or direct dye concentrates. It is an object of the present invention for the dye to be florescent. It is an object of the present invention for the dye to be an environmentally friendly chemical composition. It is an object of the present invention where the dye comprises glycerin or water and a colorant. It is an object of the present invention for the coating surrounding the seed to comprise a solid material. It is an object of the present invention for the coating made of solid material to be pre-dyed. It is an object of the present invention for the colored seed to be seen during application of the seed. It is an object of the present invention for the colored seed to be located after application of the seed. It is an object of the present invention for the colored seed to be of the similar or same color of the actual plant, flower, fruit or vegetable. It is a further object of the invention for the colored seed to assist the seed in absorbing heat. It is an object of the present invention for the colored seed to assist the seed in reflecting light.

The present invention relates to a fragranced seed comprising; a seed and a fragrance. It is an object of the invention for the fragrance to assist a user in determining the acidity of soil. It is an object of the invention for the fragrance to assist a user in determining moisture content of soil. It is an object of the invention for the fragrance to assist a user in determining chemical content of soil. It is an object of the invention for the fragrance to deter animals from eating said seeds. It is an object of the invention for the fragrance to be selected from a group consisting of a floral fragrance, a natural fragrance or cocoa. It is an object of the invention for the fragrance to be approved for use in products directly applied to the skin. It is an object of the invention for the fragrance to provide a scent which can take on a scent similar to a scent of a product applied. It is an object of the invention for the fragrance to assist a user in locating the seed after application of the seed.

The present invention relates to a colored mulch product consisting essentially of; a material comprising a fiber, cellulose, clay, loam, sand, and/or a combination of same; a binding agent; and a dye and/or pigment. It is an object of the invention for the colored mulch to further comprise NPK fortifiers. It is an object of the invention for the dye of the colored mulch assists a user in determining the acidity of soil. It is an object of the invention for the dye of the colored mulch to assist a user in determining moisture content of soil. It is an object of the invention for the dye of the colored mulch to assist a user in determining chemical content of soil. It is an object of the invention for the dye to be selected from a group consisting of acid, basic or direct dye concentrates. It is an object of the invention for the dye to be florescent. It is an object of the invention for the dye to be an environmentally friendly chemical composition. It is an object of the invention for the dye to comprise glycerin or water and a colorant. It is an object of the invention for the dye of the colored mulch to deter animals from eating a seed. It is an object of the invention for the mulch to assist the seed in absorbing heat. It is an object of the invention for the colored mulch to reflect light. It is an object of the invention for the mulch to have the color of the actual plant, flower, fruit or vegetable of a seed planted with said mulch.

The present invention relates to a fragranced mulch comprising; a mulch product; and a fragrance. It is an object of the invention for the fragranced mulch to assist a user in determining the acidity of soil. It is an object of the invention for the fragranced mulch to assist a user in determining moisture content of soil. It is an object of the invention for the fragrance to assist a user in determining chemical content of soil. It is an object of the invention for the fragrance to be selected from a group consisting of a floral fragrance, a natural fragrance or cocoa. It is an object of the invention for the fragrance to be approved for use in products directly applied to the skin. It is an object of the invention for the fragrance to provide a scent, which can take on a scent similar to a scent of a product applied.

The present invention relates to a process for coloring seeds comprising; coating a seed with a slurry, paste, or solid coating, adding a binding agent and adding a dye to the coating either prior to the coating being added to the seed, during the coating, or after the coating is added to the seed.

The present invention relates to a colored mulch product comprising; a material comprising a fiber, cellulose, clay, loam or sand and/or a combination of same, a binding agent; and a dye and/or pigment. The colored mulch product is produced by an agglomeration operation.

The present invention relates to a colored seed product comprising; a seed, a binder, a coating; and a dye and/or pigment within and/or on the coating. The colored seed product is produced by an agglomeration operation.

The present invention relates to a colored seed product wherein the color fades or disappears in response to a lack of fertilizer. The present invention relates to a colored mulch product wherein the color fades or disappears in response to a lack of nutrient or fertilizer in the mulch.

It is an object of the present invention to provide dyes to seeds and mulches for color accents and for ease in determining where the products are located. It is an object of the present invention to provide a scent to a seed or mulch to assist a user in determining where the products are located. It is a further object of the invention to provide a scent to seeds and mulches which can take on a scent similar to the scent of the product applied (floral, grass, natural), or one that is of general appeal to applicators (Cocoa, etc.).

It is an object of the present invention to provide the dye to a coating that is applied to a seed. It is an object of the present invention to use both liquid dyes and dry pigments.

The present invention relates to a method for adding a color to a gardening product. Dyes are added to a gardening product, such as, a mulch by homogeneously blending the colorant either before or at an agglomeration step. It can also be surface applied (wet or dry) after the agglomeration step.

One such example of this agglomeration is a lifting and tumbling agglomeration. A moist fiber based product, which can be impregnated with fortifiers such as NPK, is placed in a mixer. The mixer performs the work that results in an agglomerated (or granulated) product. This product is then dried to a desired level of moisture and screened as necessary. A binding agent can be added at the mixer to enhance the agglomeration/granulation process. If a binding agent is added the fiber based product, the product need not be moist.

The same methodology can be used for adding fragrances. When dyes or fragrances are added to seeds, they can be added by blending them before or at the agglomeration step. They can be applied along with or mixed with binders in the same agglomeration step. It can also be surface applied (wet or dry) after the agglomeration step. Dyes can also be added to the seed by using pre-dyed solid material as the coating material.

It is an object of the present invention to provide a dye or fragrance to a seed or mulch, which assists a user in determining the chemical content of the soil, such as whether there is enough nitrogen.

DETAILED DESCRIPTION OF THE INVENTION

Figure 1:
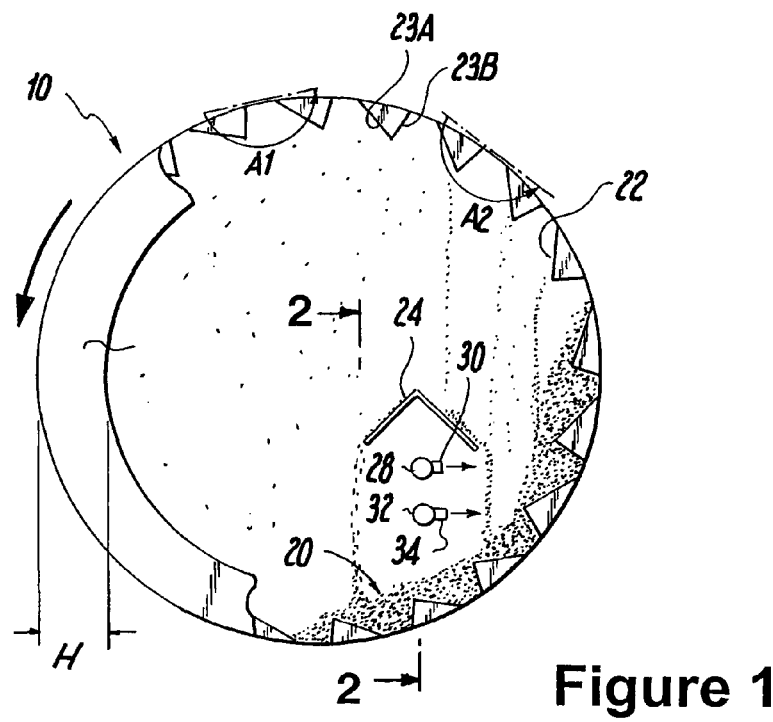
FIG. 1 is a transverse cross-sectional view of a coating drum suitable for spray-coating substrate seed according to the present invention.

The present invention relates to a product and method for colored and fragranced gardening products. The present invention provides dyes to seeds and mulches for color accents and for ease in determining where the products are located. The present invention provides a scent to a seed or mulch, which assists a user in determining where the products are located. For example, if a user is planting multiple seeds, but the seeds have a similar appearance, the use of a color or fragranced seed can assist in user in determining the seeds they are planting.

The present invention uses a wide range of colorants for coloring the gardening product. Both liquid dyes and dry pigments can be used. Concentrated solid colorants include, acid, basic and direct dye concentrates. Fluorescent and glow in the dark concentrates exhibited favorable results used alone or added to other pigments and dyes. Water-soluble dyes such as direct liquid dyes; basic liquid dyes; acid liquid dyes; and food drug and cosmetic colorants can be employed. Color is not a limiting factor. All pigments and shades tested with the present invention colored the mulch product. Numerous variations in color concentration were tested. Color intensity increased with an increase in colorant.

In a preferred embodiment, food, drug and cosmetic colorants were chosen for their environmentally friendly chemical composition. Liquid dyes were chosen, for water is already added to the current system. The most uniform and rapid mixing of the constituent was achieved with a liquid colorant. The use of a liquid colorant also kept the equipment costs relatively low. A dye including glycerin, water, and colorant created the best adsorption and vivid color. In a preferred embodiment, the dye is concentrated so that 50-75 pounds per hour of dye is incorporated into the system during full operating capacity.

A varied sample of industrial and cosmetic fragrances was tested to determine the ability to create scented fortified mulch and seeds. Cosmetic earthy scents such as: rose, lilac, bluebonnet, gardenia, grass heather, cedar wood, sage and harmony was sampled. These samples are IFRA (International Fragrance Association) approved for use in products directly applied to the skin. All samples tested were successful in absorbing the scent into the product.

Gardenia (8476) was the chosen fragrance. The fragrance was chosen because of its scent and cost. Gardenia (8476) is a commonly used fragrance in cosmetics such as soaps and lotions, and has an environmentally friendly chemical composition. In a preferred embodiment, an application rate of 0.002 pounds for a five pound container was used.

In a further embodiment, the present invention provides a scent which can take on a scent similar to the scent of the product applied (floral, grass, natural), or one that is of general appeal to applicators (Cocoa, etc.).

The present invention further relates to a method for adding a color to a gardening product. Dyes are added to a gardening product, such as, a mulch by blending homogeneously if desired, the colorant with the mulch. In one embodiment, the mulch can be blended with the colorant either before or at an agglomeration step. In a further embodiment, the dye can also be surface applied (wet or dry) after the agglomeration step.

The same methodology can be used for adding fragrances.

When dyes or fragrances are added to seeds, they can be added by homogeneously blending the seeds with the dyes or fragrances. In a further embodiment, the dyes or fragrances can be blended with the seeds before or at the agglomeration step. In a further embodiment, the dyes or fragrances can be applied to the seeds along with or mixed with binders in the same agglomeration step. In a further embodiment, the dyes or fragrances can also be surface applied (wet or dry) to the seeds after the agglomeration step. Dyes can also be added to the seed by using pre-dyed solid material as the coating material. In a preferred embodiment, the dyes or fragrances are added to a coating that is added to the seed.

In a preferred embodiment, the agglomeration performed under the invention, is done by mechanical agitation, tumbling and mixer agglomeration, thermal processes, spray methods and liquid systems, spray coating, fluid bed dryer and spray dryer technology. Compaction or pressure agglomeration is a less preferred technique under the present invention.

In a further embodiment of the invention a dye or fragrance is provided to a seed or mulch which can assist a user in determining the acidity of the soil. In the case of a dye, the dye can change color and or becomes visible in response to the acidity of the soil. Therefore, a user can adjust the pH of the soil in response to the color of the seed or mulch.

In a further embodiment, the present invention provides a dye or fragrance to a seed or mulch, which can assist a user in determining the moisture levels added to the soil. In the case of a dye, the dye can change color or become visible in response to the moisture levels added to the soil. Therefore, a user can adjust the moisture level of the soil in response to the color of the seed or mulch.

In a further embodiment, the present invention provides a dye or fragrance to a seed or mulch, which can assist a user in determining the chemical content of the soil, such as whether there is enough nitrogen. In the case of a dye, the dye can change color or appear in response to the chemical content of the soil. Therefore, a user can adjust the chemical content of the soil in response to the color of the seed or mulch.

In a further embodiment, the present invention provides a dye to a seed or mulch to either prevent the soil from overheating or to assist in adding heat to the soil.

In a further embodiment, the present invention provides a dye or fragrance to a seed or mulch which deters animals such as birds from eating the seeds or mulch.

Mulch

U.S. application Ser. No. 09/510,782 is incorporated by reference herein.

In one embodiment the dye or fragrance can be added to a fortified mulch. The fortified mulch can be made by paper fibers. This paper is placed in a mixer where NPK fortifiers and a binding agent, such as water, is added.

In one embodiment, the mulch of the present invention is made through an agglomeration/granulation process. A moist paper fiber based product can be impregnated with NPK (nitrogen, phosphorous, potassium) fortifiers in a mixer. The paper product is combined with the NPK fortifiers either before, or after entry into a mixer. The mixer performs work that results in an agglomerated (or granulated) product that is a homogeneous blend of the paper product and NPK fortifiers. Dyes are added to the mulch by homogeneously blending the colorant with the mulch. The mulch can be blended with the colorant either before or at an agglomeration step. The dye can also be surface applied (wet or dry) after the agglomeration step.

This product is then dried to a desired level of moisture and screened as necessary. A binding agent can be added at the mixer to enhance the agglomeration/granulation process. If a binding agent is added to the agglomeration process, the paper fiber based product need not be moist. In an embodiment, the dyes or fragrances can be applied to the mulch along with or mixed with binders in the same agglomeration step. To increase the percent of on-sized product, a size reduction operation can be performed on the paper fiber product prior to entry into the mixer.

In an embodiment, a paper fiber based product, which can be moist, can be impregnated with NPK fortifiers in a mixer. The mixer is preferably a pin mixer, but can also be a pan pelletizer, paddle mixer, drum granulator or other type of mixer. The pin mixer is preferably a double helix pin arrangement. The paper fiber based product is comprised of a byproduct of a paper making process. Sewage sludge can be used to create the fortified mulch rather than or in addition to paper fibers.

Seed Capsules

U.S. patent application Ser. Nos. 09/113,254 and 09/544,878 is incorporated by reference. In one embodiment, is a combination seed capsule, comprising at least one viable seed, having an outer surface and acting as a core or pseudo-core of said combination seed capsule; and a coating of a composition comprising a soil conditioning material mounted proximate, including disposed outwardly of the outer surface of said seed. In a preferred embodiment, a dye or fragrance is added to the coating of the seed.

Preferably, the coating comprises the soil conditioning material in combination with at least one ingredient effective to reduce susceptibility of the seed capsule to deleterious affect of at least one of animals, weeds, and spore formers. In some embodiments, the ingredient for reducing such susceptibility of the seed capsule is selected from the group consisting of herbicides, fungicides, for example metalxyl, and a bitter substance.

The combination seed capsule can further comprise a second coating, separate from the first coating, and comprising at least one ingredient effective to reduce susceptibility of the seed capsule to deleterious effect of at least one of animals, weeds, and spore farmers. In other embodiments, the second coating material is intermingled with the first coating material in an outer portion of the first coating, and generally displaced from the seed.

The second coating can comprise a plant nutrient, beneficial in location and in amount of availability, to a plant seedling emerging from the seed. The second coating composition can comprise an inorganic form of a plant nutrient and can be selected from the group consisting of nitrogen, phosphorous and potassium. The second coating can comprise an inorganic form of a plant nutrient and can be selected from the group consisting of e.g., urea, monammonium phosphate, diammonium phosphate, super phosphate, triple super phosphate, dicalcium phosphate, and potash or a micronutrient such as sulfur, manganese, copper, boron, iron, magnesium or chromium.

A preferred soil conditioning material is a sludge composition, such as a fibercontaining by-product of a paper making operation, or sewage sludge.

The seed capsule can comprise a water-leachable plant nutrient, and/or a leach retardant composition, such as wax, effective to retard leaching of the leachable plant nutrient out of the combination seed capsule.

In preferred embodiments, the coating remains generally disposed about the seed, and preferably but not necessarily remains generally intact about the seed, until the seed germinates.

The invention yet further comprehends a method of making a population of combination seed capsules, each comprising a seed, and a coating of a soil conditioning material, the method comprising pre-coating the seed with a material which enhances the ability of the seed to act as a nucleus in an agglomeration operation to form a pre-coated substrate; and subsequently coating the pre-coated substrate with a soil conditioning material.

In general, the coating step typically results in an overall increase in the density of pre-coated seed combination. The coating step can be accomplished by, for example, spraying the pre-coated material onto the seed, and subsequently driving off such as by drying, as necessary, any solvent or other liquid carrier used for application of the coating material to the seed.

In general, at least one seed substrate and at least one soil conditioning material are selected as raw materials, and are combined to make a combination soil conditioning seed capsule product of the invention. To this combination seed capsule is added a dye or fragrance.

The invention can operate with any of a wide variety of soil conditioning materials such as municipal or other sewage sludge, scrubber sludge, paper mill sludge, fly ash, dust, animal waste, other organic materials, inorganic materials, and mineral soil conditioning materials. The soil conditioning material can be a solid material.

Natural lignin, lignosulfonates, water, and the like, may serve as suitable binders where the soil conditioning material is, for example, paper mill sludge, raw wood, sewage sludge, or other organic or inorganic material.

The coating material may be mixed with the seed in an (e.g. ribbon) blender, or may be otherwise coated onto the substrate seed in an agglomeration process according to well-known conventional agglomeration principles.

In some embodiments, a second coating material may penetrate into the layer of soil conditioning coating material. Such penetration may comprise a generally uniform distribution of the second coating material throughout the first coating material, or may represent a more stratified or otherwise heterogeneous distribution of second coating material in or on the first coating material.

In other embodiments, the coating materials may be mixed into a heterogeneous layer. Such layer or layers of heterogeneous material can then be coated upon the outside surface of the seed.

An illustrated method of applying the binder to the substrate seed or precursor seed capsule is by using a rotating drum spray-coating apparatus. Other apparatus and methods, for example a tilted pan coating process, can be used to apply the soil conditioning material and optionally an inorganic chemical fertilizer material onto the substrate seed.

Binder material applied as may contain additional coating components such as e.g. flyash, lime, gypsum, or the like. Thus, a first binder layer may underlie or be mixed with the soil conditioning coating material, and may be overlain by a second layer of the soil conditioning coating material.

Further, it is contemplated that the soil conditioning coating may be applied first, followed by application of binder or inorganic fertilizer or sealer coating, in which case the binder or inorganic fertilizer or sealer may serve as an outer shell, temporarily trapping the inwardly-disposed materials inside the seed capsule. In the alternative, the soil conditioning coating may be applied first, followed by application of the binder, wherein the binder penetrates through the soil conditioning coating, either physically or chemically, to the underlying substrate seed and provides the binding property, as one or more components for assisting in adding bulk and thickness to an inner binder layer prior to any, or the majority of, the application of the organic coating material.

It should be understood that the more porous the established soil conditioning coating, or e.g. the outer surface of such coating, the more any subsequent spray material penetrates the established coating. All such penetration is contemplated in use of the term "coating" herein.

In some preferred embodiments, the overall coated combination seed capsule product comprises seed capsules wherein substantially the entirety of the soil conditioning material is confined to a contiguously-defined portion of the seed capsule. In such embodiments, the structures of the finished product seed capsules comprise coatings of contiguously arranged elements of the soil conditioning material, generally arrayed entirely or substantially entirely about the seed, which coatings may be overlain by an additional layer, optionally discontinuous, of organic or inorganic chemical fertilizer.

In addition, or in the alternative, other layers of other materials whether soil conditioning materials, organic or inorganic fertilizers, or other materials, can be applied to the substrate seed before applying the above mentioned layer of soil conditioning sludge.

Further to the structure of the seed capsules, the coatings on the seed capsules need not generally represent a uniform mixture of the inorganic chemical fertilizer and the soil conditioner. Rather, in a typical seed capsule a core substrate seed is overlain or encapsulated by a soil conditioning material, and is generally free from a second overlying soil conditioning coating material.

The second coating can, and preferably does, in some embodiments, penetrate into voids or other interstices in an underlying e.g. soil conditioning coating. However, preferably most if not all elements of the underlying e.g. soil conditioning coating material are generally interconnected with each other without intervening coating material of the second layer, except for an optional binder used to hold the first coating material together as a unitary structure, separate from any structure and bonding provided by the second coating material.

In a preferred embodiment the coating process operates according to conventional and generally well known agglomeration principles, as described by Wofgang B. Pietsch in an article entitled "The Agglomerative Behavior Of Fine Particles." Such coating process uses water and heat, along with physical and/or chemical adhesives and like properties, to bind or agglomerate a plurality of types of particles and/or materials into coated seed capsules, each typically containing an individual seed.

In some embodiments of the coating/agglomeration process, it is desirable to precoat the seeds prior to implementing agglomeration principles to produce the above described coating of soil conditioning material.

The seeds, whether pre-coated or not pre-coated, and the one or more soil conditioners, are received within a mixer where growth enhancers such as time release agents and/or other environmental conditioners may be added to form a combination seed capsule. The seeds are then received into a pan pelletizer, a rotary drum, or the like, where binders such as water, lignin, lignosulphonates, molasses, sodium silicate, wax, monammonium phosphate, or urea can be added and thereby coated onto the pre-coated seeds.

Figure 2:
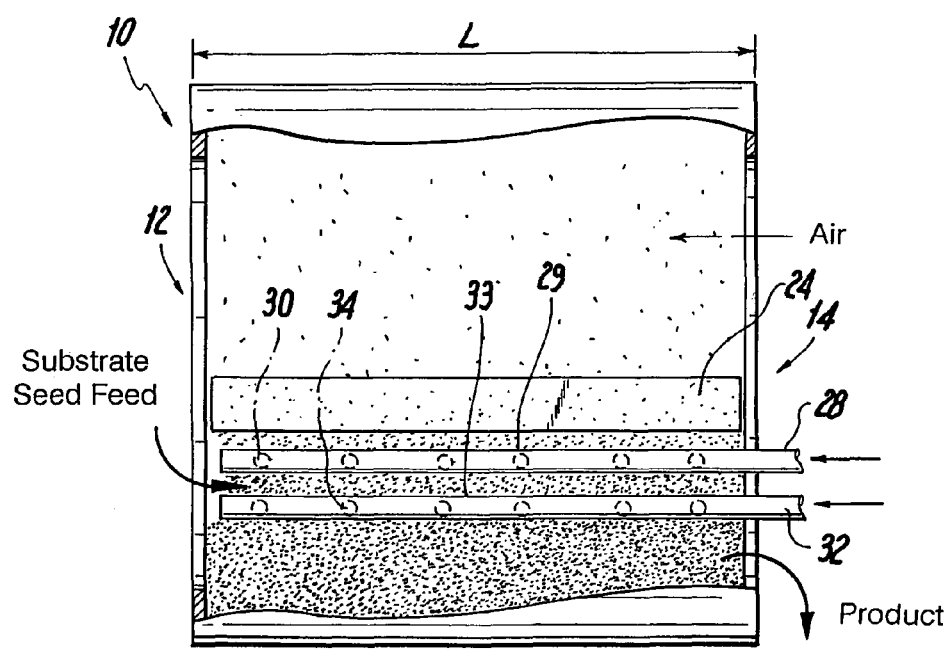
FIG. 2 is a partially cut away view showing a length of the drum of FIG. 1.
Figure 4:
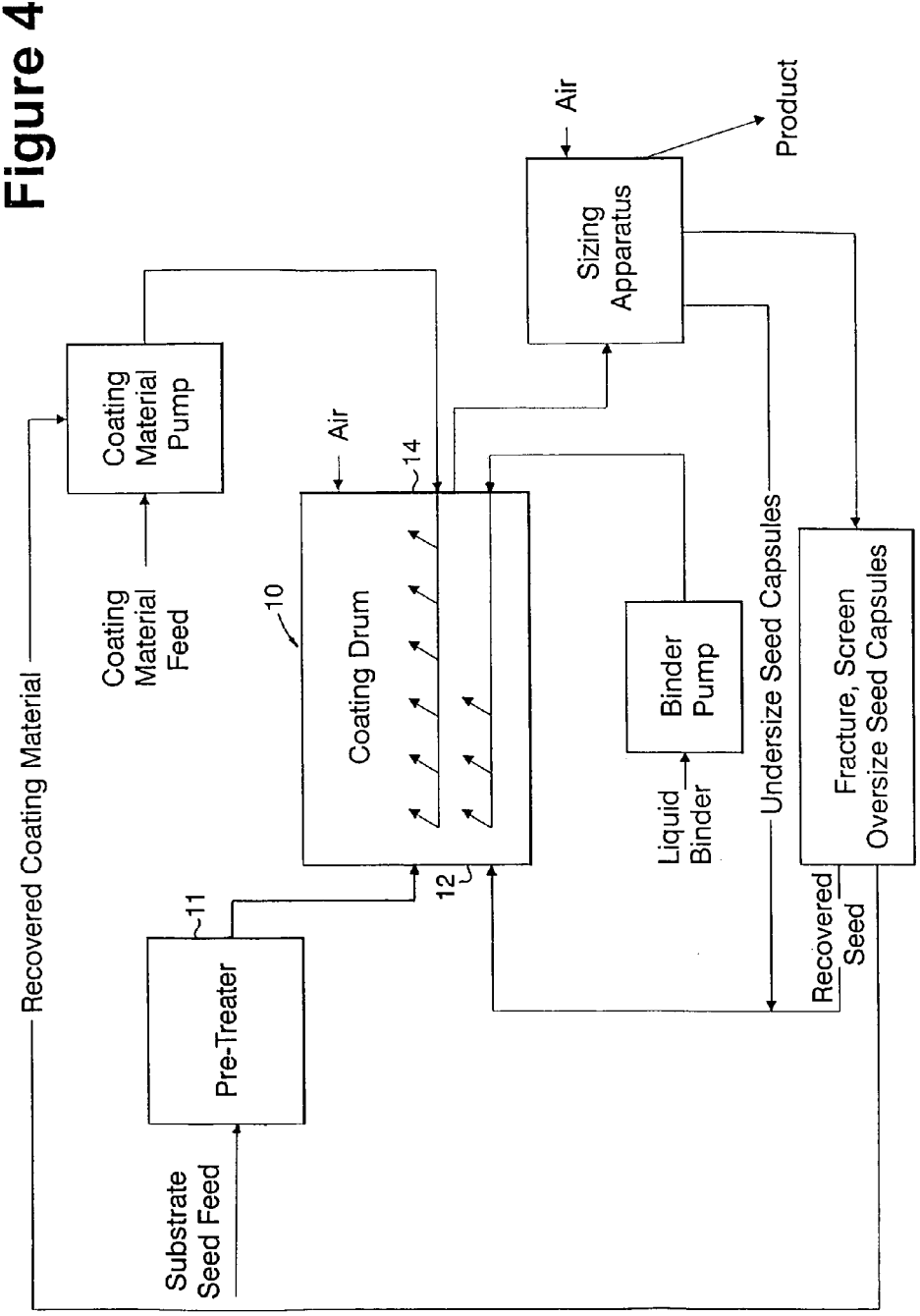
FIG. 4 is a block diagram illustrating a second manufacturing process for producing combination seed capsule product of the invention.

As illustrated in FIGS. 1, 2 and 4, spray apparatus can operate within a rotating drum disposed in a generally horizontal orientation. The drum may incorporate internal lifting flights which lift free-flowing (e.g. seed and growing seed capsule) particles in the drum and then let the particles fall to the bottom of the drum as a continuously falling curtain or cascade. In some embodiments, the interior of the drum is either clean and free from any fighting, or has only mixing fingers or flights that expand the area by the bed, that keep the bed rolling as the drum rotates, and that generally improve mixing, rather than lifting particles to the top of the drum and then releasing them in a falling cascade. However, such lifting of particles to the top of the drum, and corresponding falling cascade or falling curtain, are not excluded from processes of the invention. Rather, both such finger mixing, and such lifting coupled with falling cascade or curtain, are included within the scope of the invention.

Stationary spray nozzles are positioned within the drum to project the sprayed material onto the rolling bed, and optionally onto any curtain or cascade of falling particles. For a continuous process, the drum is preferably inclined at a small angle from horizontal, such as, without limitation, about 0.25 inch to about 0.38 inch from the horizontal for each foot of length of the drum, so that rotation of the drum causes the particles to move from the inlet end of drum to the discharge end, while maintaining a relatively uniform bed thickness. The optimum degree of incline varies with each set-up and may thus be outside the above range. The important parameter is to contribute to maintaining a bed of seed and seed capsule particles having sufficient uniformity that the spray material can be effectively applied to the particles passing through the drum. The particles are then discharged at the discharge end of the drum.

FIGS. 1 and 2 show schematically a first embodiment of the processing equipment which may be used to produce seed capsules of the invention. Such processing equipment includes a drum and sprayer combination suitable for continuously producing coating seed capsules in accord with the invention. Use of the illustrated drum and sprayer combination is not critical, however, as other drum and sprayer combinations, or other coating methods such as pan coating methods, are also suitable. In FIGS. 1 and 2, drum 10 has an inlet end 12 for receiving the substrate seed material or materials, or partially formed or pre-coated seed capsule precursors. Drum 10 has a discharge end 14 through which agglomerated or otherwise coated seed capsule product particles are discharged over discharge retaining ring 16. A variable speed rotary drive (not shown) is provided for supporting and rotating the drum 10 in a counterclockwise direction as viewed in FIG. 1 at controlled, and changeable drive speeds. Conventional slope adjustment apparatus (not shown) is provided for routine and ongoing adjustment the slope of the drum from horizontal.

Air is preferably supplied from discharge end 14 as shown in FIG. 2, and flows countercurrent to the direction of travel of the seed substrate material. Since the contemplated coating materials are generally applied to the seed in liquid, or semi-liquid, or other moist form, and since some coating materials may thus tend to form clumps or other wise self-agglomerate when exposed to ambient moisture conditions, air supplied at discharge end 14, and elsewhere in the process for contact with the coated seed and seed capsules, is preferably dried in order to cost-effectively remove an optimum amount of the moisture from the coating material and to assist in maintaining suitably low moisture content in the thus coated and dried seed capsules.

A first stationary spray assembly 28 extends longitudinally within drum 10 above and adjacent the bed 20 of seed and/or seed capsules. First spray assembly 28 includes pipe 29 and nozzles 30. A second spray assembly 32 extends longitudinally within drum 10 generally adjacent first spray assembly 28. Second stationary spray assembly 32 includes pipe 33 and nozzles 34, which transport the material to be sprayed. Nozzles 30 and 34 are connected to pipes 29 and 33 respectively, and project sprays of liquid or otherwise particulate coating material toward the bed of seeds and/or seed capsule precursors. The description of spray assemblies 28, 32 as stationary means that the spray assemblies to not rotate with drum 10. However, the positions of either nozzles 30, 34 or pipes 29, 33, or both, can be adjusted within the drum for proper direction of the respective spray or sprays onto the bed of seeds and/or seed capsules or seed capsule precursors.

A stationary protective cover 24 is mounted over the spray assemblies. Seeds and/or seed capsules falling from the inner surface of the drum and the flights, above the spray assemblies, fall onto the cover, and are deflected away from the spray assemblies, as shown in FIG. 1. Thus, cover 24 protects the pipes and nozzles from the falling seeds and seed capsules falling onto and fouling the pipes and spray nozzles.

As drum 10 rotates, flights 22 lift and mix the seeds, seed capsule precursors, and seed capsules, but do not generally carry the bulk of the seeds and seed capsules up to the top of the drum. Some small amount of seeds, seed capsule precursors, and seed capsules will be carried upwardly to the top of the drum by even a drum devoid of any flights. Thus, all drums experience some amount of seeds and seed capsules falling from the upper part of the rotating drum whereby cover 24 is beneficial for protecting spray assemblies 28 and 32.

Preferred flights 22 are primarily directed toward enhancing mixing of the bed 20 of seeds and seed capsules, continually refreshing the surface of the bed with a newly-emergent supply of seeds and seed capsules, rather than lifting and subsequently dropping the seeds and seed capsules which may be fragile when initially coated. To that end, each flight 22 preferably, but without limitation, has a leading surface 23A extending at an obtuse angle "A1" of at least 90 degrees with respect to the inner surface of the drum. A more preferred angle "A1" is about 100 degrees to about 150 degrees. Trailing surface 23B of flight 22 can be virtually any angle, with the inner surface of the drum, which angle does not interfere with the operation of adjacent leading surfaces 23A.

Additional retaining rings can be added to the assemblage shown in the drawings, in order to provide that height "H" to the retaining ring which will provide and maintain the optimum configuration of bed 20 inside drum 10.

As noted above, inlet end 12 of the drum may be raised above discharge end 14. When in use, the drum rotates continuously. Seeds or previously thinly-coated or partially-coated seed capsules are continuously fed into inlet end 12 and thus added to rolling bed 20. Flights 22 continuously mix the bed as the drum rotates, refreshing the bed surface with newly fed seeds, or seeds and seed capsules newly brought to the surface by the continuous rotation of the drum in combination with the mixing action of the flights. Spray assembly 28 sprays the desired coating material (e.g. sewage sludge, paper mill sludge, or other coating composition, onto the continuously moving and mixing surface of the bed 20 from a plurality of nozzles 30 distributed along the length of pipe 29, and similarly along the length of drum 10, adding the sprayed material to the seeds and seed capsules in bed 20. After receiving the spray coating from spray assembly 28, the seed capsules are discharged through discharge end 14. In some embodiments, the seed capsules pass through a cooling chamber, not shown integral in drum 10, before being displaced through discharge end 14.

In general, as the seeds traverse the drum, from inlet to discharge, nozzles 30 atomize the liquid or other coating material and spray such atomized coating material as e.g. droplets of the coating material onto the seeds in the bed. The result is that the seeds become generally uniformly coated with one or more layers of the coating material such that the coating material becomes an integral part of the respective seed capsules fabricated in the drum. As the coating material solidifies on the seeds, the coating material tightly bonds to the respective portions of the seeds.

As the seeds and seed capsules roll and mix with rotation of the drum, the incline of the drum causes the seeds and seed capsules to travel from inlet end 12 toward discharge end 14.

In the alternative, or where a coating material is not readily self-bonding to the seed material, a binder material can be provided toward the inlet end of the drum at spray assembly 32, through pipe 33 and nozzles 34. In such embodiment, the binder is preferably sprayed onto the seeds closer to inlet end 12 rather than along the entire length "L" of the drum. The coating material is then preferably sprayed onto the seeds downstream from the inlet end, and preferably relatively downstream of nozzles 34. Thus, the seeds receive a first coating of the binder, and a subsequent second coating of e.g. liquid soil conditioning coating material overlying the binder.

Binder material applied as e.g. through spray assembly 32 may contain additional coating components such as e.g. flyash, lime, gypsum, or the like, as one or more components for assisting in adding bulk and thickness to an inner binder layer prior to any, or the majority of, the application of the organic coating material (e.g. sewage sludge or paper mill sludge).

Regarding the coating process, FIG. 4 illustrates in flow sheet form manufacturing process for producing seed capsules of the invention, using the coating drum 10 as described above. It should be understood, however, that other equipment such as a pan pelletizer, a paddle mixer, or the like can be used in place of the rotary drum to obtain combination seed capsules of the invention.

Figure 3:
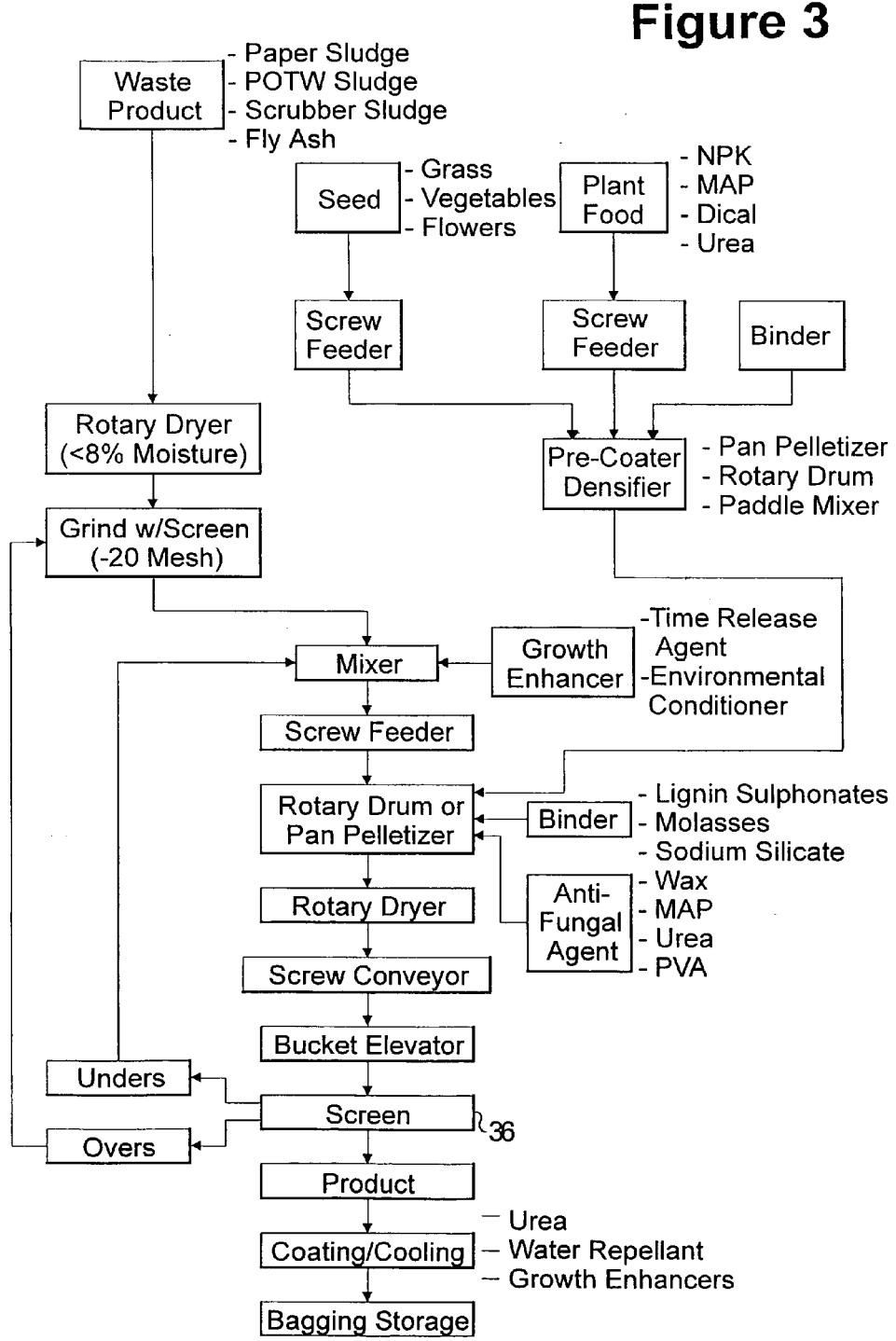
FIG. 3 is a schematic representative flow diagram illustrating a first manufacturing process for producing combination seed capsule product of the invention.

Referring to the drum of FIGS. 1 and 2, and to the pan pelletizer block in FIG. 3, the seeds are fed continuously to an inlet as at inlet end 12 of drum 10. Combination seed capsules, produced as described above, are released from a discharge end 14 of the drum to a sizing apparatus 36 in which the seed capsules are sized through conventional sizing elements. Suitably-sized seed capsules are discharged from the sizing apparatus as product for distribution. Undersize seed capsules are fed back into mixer as shown in FIG. 3. Oversized seed capsules are fractured and screen for reprocessing.

Example 1

A coating drum as illustrated in FIGS. 1, 2 and 4 is used to place a coating of paper mill sludge on grass seed. Raw material grass seed about 4-6 millimeters long and about 0.5-1.0 millimeter thick, is continuously fed to pre-treater 11, where the seed is blended with powdered lime, powdered flyash, and a lignosulfonate binder, to form partially-developed seed capsules comprising seeds coated with relatively thinner coatings of the recited mixture of coating materials. The partially-developed seed capsules are continuously fed to inlet end 12 of drum 10, to form a bed 20 of the partially-developed seed capsules. The drum rotates continuously. The rolling of the drum, and the associated mixing affect of the flights, provide a constantly changing top surface of the bed. A paper mill sludge slurry is supplied in pipe 28 at pressure sufficient to atomize the liquid sludge slurry. A liquid sludge slurry is thus sprayed from nozzles 30 onto the top surface of the bed of partially-developed seed capsules, applying a sludge coating on those partially-developed seed capsules which are at the upper surface of the bed at any given point in time.

The resulting seed capsules, of paper mill sludge coated seeds, have a coating of solid conditioning sludge thick enough to make the material a product marketable for its soil conditioning content as well as for the seeds contained therein. Increased levels of nitrogen and/or other plant nutrients can be added by, without limitation, providing sprays of the other desired materials, preferably subsequent to at least the initial sludge slurry spray. Other materials can be included in one or more of the sprays e.g., to retard or enhance moisture permeation into or out of the combination product in accord with the anticipated storage and/or use environment of the product.

Example 2

Figure 5:
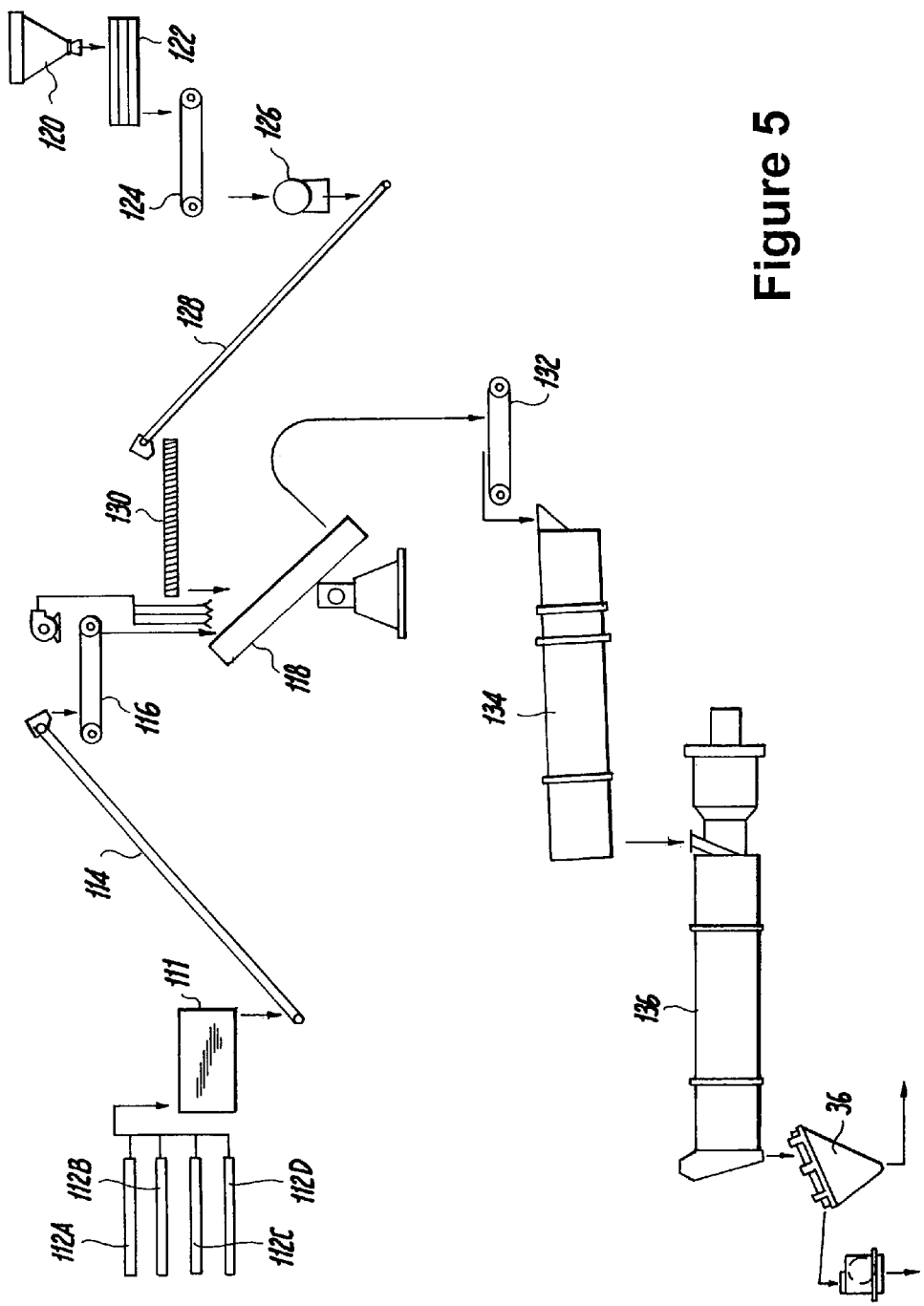
FIG. 5 is a schematic representative flow diagram illustrating a third manufacturing process for producing combination seed capsule product of the invention.

FIG. 5 illustrates the equipment used in this EXAMPLE 2. As seen therein, grass seed, lime, flyash, and calcium lignosulfonate binder are fed to ribbon blender 111 by respective screw feeders 112A, 112B, 112C, 112D respectively. Ribbon blender 111 encapsulates the seed with a thin layer of the mixture of lime, flyash and lignosulfonate to thereby make partially-formed seed capsules. The partially-formed seed capsules are discharged from the ribbon blender and conveyed by conveyor 114 and belt feeder 116 to a tilted-pan pelletizer 118, which rotates about a fixed axis.

Paper mill sludge is received into a weigh hopper 120 at about 60% by weight water, and is fed by screw feeder 122 and belt 124 to pin mixer 126. The pin mixer breaks down the fiber and fiber clusters of the sludge into loose separate fibers, and discharges the resultant material onto conveyor 128 which transports the material to screw feeder 130, and thence into the tilted pan pelletizer.

In the titled pan pelletizer, the partially-formed seed capsules, (seeds being coated with lime, flyash, and lignosulfonate) are mixed with the comminuted paper mill sludge and thereby coated with the sludge. By operation of the tilted rotating pan pelletizer, the larger seed capsules generally rise to the top of the bed of seed capsules in the pan, and as additional material (sludge and partially-formed seed capsules) are added to the pan, the larger seed capsules overflow the lower edge of the rotating pan, onto vibrating feeder conveyor 132.

The vibrating feeder conveyor feeds the seed capsules into granulator 134 (e.g. rotating drum) where the seed capsules may be (e.g. spray) coated with inorganic fertilizer or other desired material.

From the granulator, the seed capsules flow into dryer 136 and are dried to a final product moisture of about 2-3% by weight water. The resultant product is then screened by screen 36 and sized as before by sizing mill 37, with undersized and oversized product seed capsules being recycled for further processing.

Figure 6A:
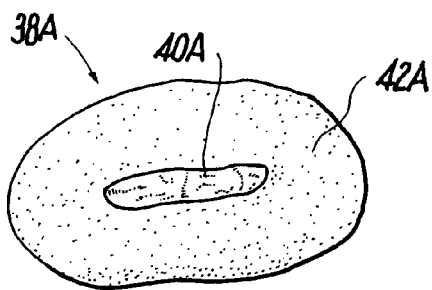
FIGS. 6A, 6B, 6C, and 6D show cross sections of seed capsules of the invention.

Referring now to FIGS. 6A-6D, in the embodiment of FIG. 6A, seed capsule 38A comprises a seed 40A coated with a single generally homogenous coating 42A. Coating 42A, as illustrated in FIG. 6A, may comprise only the soil conditioning material (e.g. paper mill sludge or sewage sludge), or may comprise both the soil conditioning material and an inorganic fertilizer or other inorganic material generally dispersed in coating 42A.

Figure 6B:
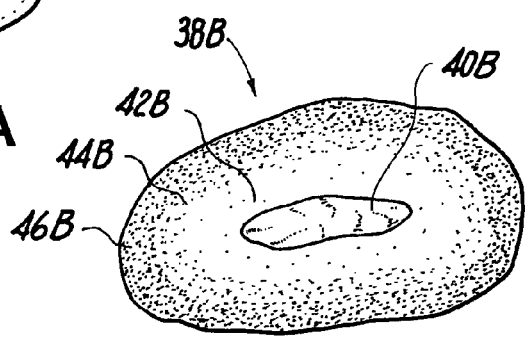

In FIG. 6B, seed capsule 38B comprises a seed 40B coated with a first layer 42B of solid conditioning material. A second coating material is shown penetrated partway through the first layer 42B, thus to make a combination outer layer 44B comprising the combination of the material of layer 42A and the material of the second material, such as inorganic fertilizer.

Figure 6C:
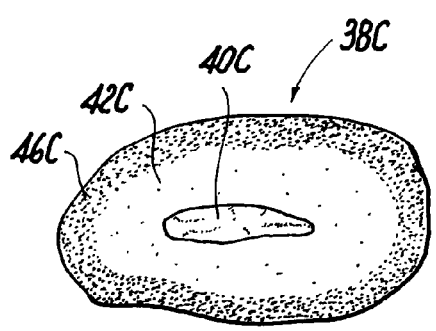

In FIG. 6C, seed capsule 38C comprises a seed 40C coated with a first layer 42C of soil conditioning material. A second generally separate and distinct layer 46C of a second coating material (e.g. inorganic fertilizer) is disposed outwardly on the underlying first layer 42C. Layer 46C generally does not penetrate layer 42C, whereby higher levels of inorganic fertilizer may be used because of the effective displacement distance between the seed and the second layer 46C. The second layer may be prevented from penetrating the first layer by applying e.g. an intervening layer which repels the second layer, for example was, lignin, or the like.

Figure 6D:
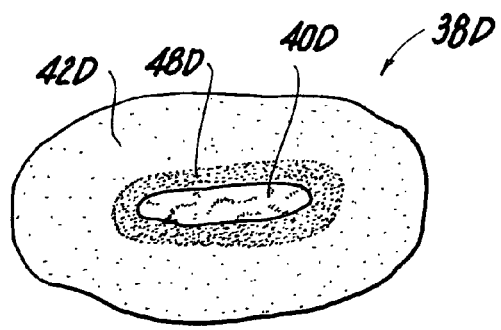

In FIG. 6D, seed capsule 38D comprises a seed 40D coated with a pre-coating layer 48D of dicalcium phosphate to densify and configure the seed capsule precursor for the primary coating steps in drum 10 or pan pelletizer 118. Layer 42D of soil conditioning material is disposed outwardly of pre-coating layer 48D. Other materials such as at layers 44B or 46C can be added to any of the embodiments including that of FIG. 6D to provide the properties associated therewith.

Figure 7:
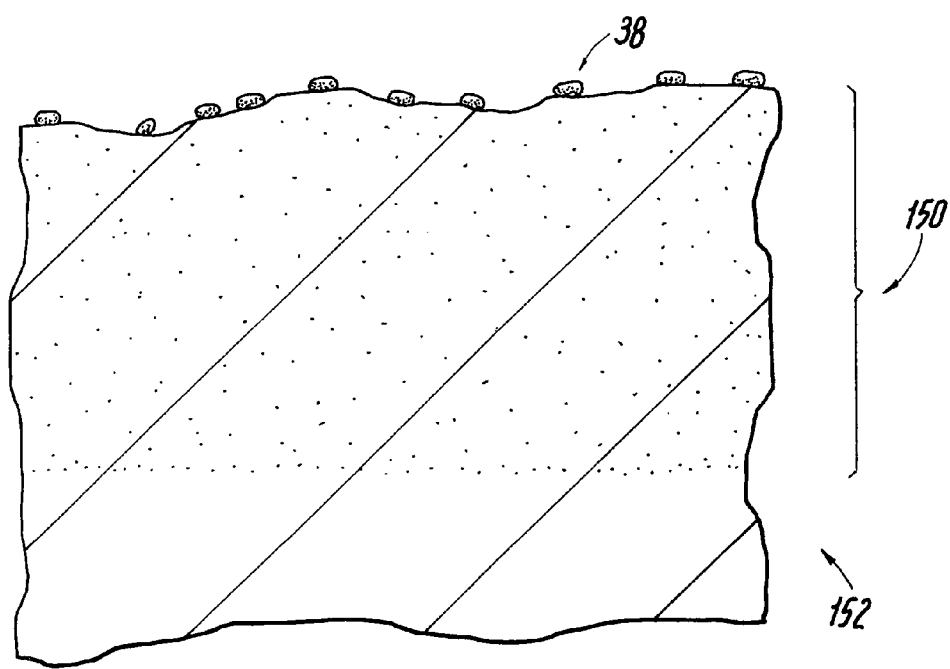
FIG. 7 illustrates a cross-section of the soil root zone, and a representative population of seed capsules at the top surface of the soil.

Referring to FIG. 7, a population of seed capsules 38 are disposed at the top surface of a cross section of soil. Root zone 150 of the soil is generally defined to that depth of the soil which typically receives roots of growing plants, and is generally defined within 20-30 inches of the top surface of the soil. Generally, and preferably, the root zone should have a soft texture, rich in organic and/or other soil conditioning material in order to provide good tilth, and desirable moisture and nutrient holding properties. Underlying root zone 150 is subsoil 152 which typically contains little organic matter.

It is a well known agricultural phenomenon that, in soil used for intensive crop production, the root zone tends, over time, to become relatively depleted of organic solid conditioning material, illustrated at 154 in FIG. 7, negatively affective soil tilth and texture. While wholesale addition of organic soil conditioning material can improve the overall tilth of the soil, FIG. 7 illustrates application of the invention wherein the texture of the material immediately adjacent the seed, namely coating 42, provides beneficial properties attributes to soil having desirable texture.

Figure 8:
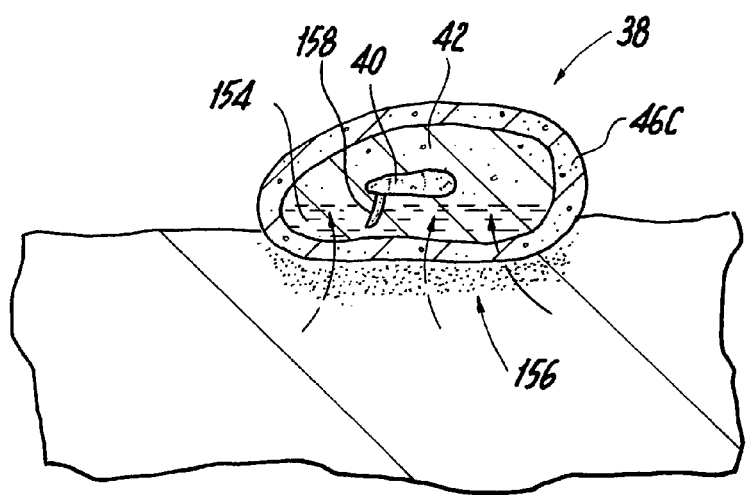
FIG. 8 illustrates a single seed capsule on the soil surface, and the microenvironment developing about the seed capsule.
Figure 9:
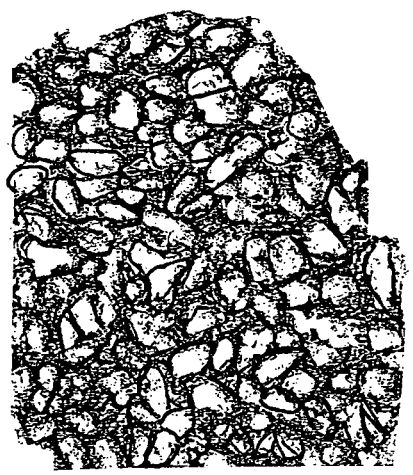
FIG. 9 is an embodiment of the mulch of the present invention.

FIG. 8 illustrates that coating 42 draws moisture 154 from the soil, into the capsule, where the moisture through second coating 46C releases plant nutrient material into the moisture, as well as downwardly into the soil adjacent the seed capsule, as illustrated at 156. Thus, the root 158 emerging from the seed emerges into an initial growth medium, coating 42, having texture, moisture, and plant nutrient highly advantageous to early plant growth. As root 158 advances further downward, the upper portion of the underlying solid under the capsule where the seed first enters the soil, has also been beneficially affected to the good of the plant by plant nutrients 156, and by moisture attracted or held in the vicinity of the capsule as a result of the presence of the soil conditioning material in the capsule.

The invention claimed is:

1. A method of determining moisture content of soil and/or seed at soil surface comprising:
   placing a mulch product at surface of soil;
   said surface of said soil containing seed(s);
   determining moisture content of said surface of said soil and/or seed by color intensity of said mulch product;
   changing color intensity of said mulch product when moisture is removed from said mulch product;
   changing color intensity of said mulch product when moisture is added to said mulch product;
   adjusting moisture level of said surface of said soil and/or seed in response to said color intensity of said mulch product;
   said seed consisting essentially of grass, vegetable and/or flower seed;
   said color coming from a pigment and/or dye in said mulch product;
   said mulch product comprising a fiber, cellulose, clay, loam, sand, and/or a combination of same;
   said color intensity of said mulch product has a relationship to said moisture content of said surface of said soil and/or seed, indicating watering needs of said seed.

2. The method of claim 1 wherein said pigment and/or dye is added to said mulch product.

3. The method of claim 1 wherein said mulch product further comprises NPK fortifiers.

4. The mulch product of claim 1 wherein said dye comprises glycerin or water and a colorant.

5. The method of claim 1 further comprising:
   producing said mulch product by methods that include an agglomeration/granulation operation.

6. The method of claim 1 wherein said dye changes color and/or becomes visible in response to moisture levels added to said surface of said soil.

7. The method of claim 1 wherein said color fades and/or disappears in response to a lack of moisture in said mulch product.

8. A method of determining moisture content of soil and/or seed at soil surface comprising:
   placing a mulch product and seed together at surface of said soil;
   determining moisture content of said surface of said soil and/or seed by color intensity of said mulch product;
   changing color intensity of said mulch product when moisture is removed from said mulch product;
   changing color intensity of said mulch product when moisture is added to said mulch product;
   adjusting moisture level of said surface of said soil and/or seed in response to said color intensity of said mulch product;
   said seed consisting essentially of grass, vegetable and/or flower seed;

said color coming from a pigment and/or dye in said mulch product;

said mulch product comprising a fiber, cellulose, clay, loam, sand, and/or a combination of same;

said color intensity of said mulch product has a relationship to said moisture content of said surface of said soil and/or seed, indicating watering needs of said seed.

9. The method of claim 8 wherein said pigment and/or dye is added to said mulch product.

10. The method of claim 8 wherein said mulch product further comprises NPK fortifiers.

11. The method of claim 8 wherein said dye comprises glycerin or water and a colorant.

12. The method of claim 8 further comprising:
producing said mulch product by methods that include an agglomeration/granulation operation.

13. The method of claim 8 wherein said dye changes color and/or becomes visible in response to moisture levels added to said surface of said soil.

14. The method of claim 8 wherein said color fades and/or disappears in response to a lack of moisture in said mulch product.

15. A method of determining moisture content of soil and/or seed at soil surface comprising:
placing a mulch product at surface of said soil;
said surface of said soil containing seed(s) and/or plant(s);
determining moisture content of said surface of said soil and/or seed by color of said mulch product;
changing color of said mulch product when moisture is removed from said mulch product;
changing color of said mulch product when moisture is added to said mulch product;
adjusting moisture level of said surface of said soil and/or seed in response to said color of said mulch product;
said seed consisting essentially of grass, vegetable and/or flower seed;
said color coming from a pigment and/or dye in said mulch product;
said mulch product comprising a fiber, cellulose, clay, loam, sand, and/or a combination same;
said color intensity of said mulch product has a relationship to said moisture content of said soil and/or seed, indicating watering needs of said seed.

* * * * *